(12) United States Patent
Arnold

(10) Patent No.: X6546
(45) Date of Patent: May 7, 1831

(54) HORSE POWER, OR ANIMAL

(76) Inventor: William E. Arnold

William E Arnold of Chatham. State of Connecticut.

The Schedule referred to in these Letters Patent and making
part of the same containing a description in the words of the said
William E Arnold himself, of his improvement in the machine for
applying Horse, or other animal power, to sundry mechanical pur
poses ......... To all to whom these presents shall come.
Be it Known that I William E Arnold, of Chatham in the Coun-
ty of Middlesex and State of Connecticut, have invented a new
and useful improvement in a machine for the application of Horse
or other animal power to sundry mechanical purposes, and that
the following is a full and exact description of the construction
and operation of said machine as invented or improved by me.

This machine is eleven feet and two inches long, two feet
wide and nine inches deep, the sides and ends of which are made of
two inch plank, framed or dovetailed together. Thirteen pieces of board
three quarters of an inch thick and four inches wide, cross from one side
plank to the other; and are dovetailed into them on the under side
at equal distances one from another. On the top of these boards
and near the side planks, are two strips of board, three inches wide
and three quarters of an inch thick, and running the whole length
of the machine. In the central part of the machine, two feet &
three inches from each end thereof, and three and a half inches
from the upper edge of the sides, are two pieces of boards, six inches
wide and one inch thick which go from one side plank to the
other and rest in them. On the top of these boards and against the
inside of the planks are two bars of iron six feet and two inches long
two and a half inches wide and three eighths of an inch thick. Two
feet and two inches from the forward end of the machine, and three
and a half inches from the upper edge of the side planks, is a shaft
two inches square, made either of wrought or cast iron, which turns in
cast iron boxes, composed of two parts, and set in the side planks. The
shaft extends eight inches out from the sides of the machine for the purpose of applying to it drums or gearing). On the shaft within the side planks are two cast iron spur wheels, four inches in diameter and one and a quarter inch thick. At the hinder end of the machine, three inches from the end, and three and a half inches from the upper edge of the side planks, are two other wheels or rollers running on bolts or arbors secured firmly in the planks. There are nine wooden treads for the horse to travel on, each two feet long, fourteen inches wide and one inch and a half thick, and sheathed or covered on the top with good substantial plank, one and a half or two inches thick. Through both ends of each tread is a round iron or axis, one inch in diameter; the axis, at the end of each tread nearest the forward end of the machine, is seventeen inches long and extends from the sides of the tread one and a half inch, and the other axis is twenty inches long, extending from the sides of the treads three inches. On each end of these round irons or axes is a friction roller for the treads to run on. An iron chain, or a rope or belt goes from the spur wheels at the forward end of the machine to the wheels or rollers on the hinder end on each side of the machine. The chains are made with square links so as to mesh over the spurs or cogs on the wheels. The chains, ropes, or belts, are also attached to the ends of the longer iron or axes which pass through the treads. There is a piece of timber fourteen inches long and two inches square pinned on to each end of the side planks, three inches from the top, and nine inches from the forward end of the machine, on the inside of the planks which reach within one and a half inch of the spur wheels. On each of these pieces, are two pieces of iron, one of which is eight and the other twelve and a half inches long, and one inch square. The shorter piece is worked or bevelled off to an edge at both ends on opposite sides and holes are made one inch from one end and screws or bolts go through them into the timbers, fourteen feet long and two inches square above mentioned two inches from the forward end of them; & the other end drops down on the lower part of the machine towards the forward end for
the friction rollers of the shorter axis of the treads to run upon.
The peices of iron twelve and a half inches long, are fastened at one end
near the ends of the others, and fall the other way on pins fixed
in the sides of the machine to prevent their going too low. At the
hinder end of the machine four inches from the ends of the
iron bars and seven inches from the end of the machine are two
peices of timber, pinned to the side planks, three and three quarters
inches from the top thereof, fourteen inches long and two inches square
On the top of each of the side planks is a board, an inch thick, pla-
-ced even with the planks on the outside & extending over them two
or three inches on the inside and made fast by screws. The forward
ends of these boards are directly over the shaft before described.
Of the same length and thickness with these boards, and eight in-
-ches in width are two other boards over the rollers, fastened near
the lower edge, by screws or nails to the inner edge of the former,
and bebelled or rounded off, so as to bring the upper edges even
with the outside of the side planks. On the outside of the side
planks of the machine is a frame consisting of four posts or
uprights two inches square fastened to the side planks, by pins
or screws at the ends of the boards last mentioned and rising two
feet and a half above the top of the side planks. These uprights
on each side are made steady & firm, by braces extending from
the upper end of one to the other at the upper edge of the side
plank, crossing and falling into each other at the point of
crossing. At the upper end of these uprights on the outside to-
-wards the ends of the machine are two peices of timber two
inches square, extending across from one upright to the other,
fastened at one end by a bolt or screw so as to turn, and resting
at the other end in a wooden or iron catch or notch. The ends
of the machine on the outside of the frame are covered with boards
or plank of convenient thickness. In the centre of the end of each
tread, which is towards the forward end of the machine, may be firmly fixed a piece of iron a quarter of an inch thick and an
inch and a half wide and extending one inch out of the tread
and so fitted as to enter a place or mortise in the end of the tread
following it as it rises in the forward part of the machine, for the
purpose of giving steadiness to the motion of the treads and of
preventing their moving sideways. The pieces of timber near the
two ends of the machine and also the four pieces of iron in the
forward end may be omitted altogether and the two axes at the
ends of each tread be made of the same length as the shorter
but in such case the wheels or rollers in the hinder end of
the machine must be placed about half the length of one
tread farther from the end of the machine and the spur wheels
in the other end about as much nearer to the forward end &
the latter wheels must be supported in the same manner as
the wheels or rollers in the hinder end. The shaft in the for-
-ward end should be placed in the centre or back of the centre
of the machine, also an additional axis or round iron twenty
inches long should go through about the centre of each tread.
The bolts which support the wheels or rollers in the hinder
end may be fitted so as to turn, and may extend through on
the outside of the machine, and the shaft may be connected with
the wheels on the forward or hinder end of the machine by
means of suitable gearing or by drums & bands or belts, either
on the inside or outside of the machine. Also in each of the
end pieces of the ten pieces of boards which go from one side
of the machine to the other, may be placed two friction rollers
of suitable dimensions, to facilitate the motion of the tread
and near each end of the machine on the inside of the side
planks are fixed circular guides for the rollers of such size and
in such a manner as to regulate the motion of the treads when
rising and falling. By a second method of making this mach
the chain, rope, or belt, for the purpose of connecting the treads
and turning the spur wheels, is not used. According to this
method method the side planks being nine feet and a half long and nine inches and a quarter wide; extending across the machine nine and three eighths inches from one end, is a bar of iron, three eighths of an inch square and let into the under side of the side planks three eighths of an inch. Two pieces of board four inches wide and one inch thick, extend the whole length of the machine and are made fast to the under edges of the side planks. Two pieces of board in the central part of the machine across it four and five eighths inches from the top of the sides Two shafts thirteen & three eighths inches from each end, rest in boxes in the sides of the machine and one of the shafts extends through on the outside of the machine a suitable distance for applying the power of the machine. On each of these shafts on the inside of the side planks and two inches therefrom, are four notched wheels seven and seven eighths inches in diameter. Seven and seven eighths inches from the shafts and between each of them, and each end of the machine are two other notched wheels of the same dimensions, half an inch from the sides of the machine and running on bolts secured in the sides. Between the notched wheels and the side planks let into the sides are eight small gear wheels, three and a half inches in diameter and half an inch thick and between each pair of the small gear wheels also let into the sides is another gear wheel four and three eighths inches in diameter which runs on a round bolt secured in the side planks. The object of these gear wheels is to cause the outer notched wheels to move in the same direction as the inner ones. Four of the small gear wheels are fixed on the shafts and the other four are on the same bolts with the notched wheels. The treads are twenty four in number, ten inches long and fourteen inches widthways of the machine. On each side of each tread are five iron bolts, half an inch in diameter and inch and a half from each other, the end ones being one inch from the ends of the tread. the bolts are inserted in the tread so far as to
render them sufficiently firm - the two end bolts on one end extend out
two inches and three quarters, on the other end two inches and a quarter,
the remaining six seven eighths of an inch. A bar of iron a quarter of
an inch thick, and an inch and a quarter wide having holes made
therein to correspond with the bolts, is placed on the bolts on each side
of the treads. On the end bolt of each tread are four friction rollers one
inch and seven eighths in diameter and half an inch thick. On the
cross pieces in the central part of the machine, and three inches from the
side planks on each side of the machine, are two iron bars or pieces of
board, seven feet long, two and a half inches wide and one inch thick
and five eighths of an inch from each other and fastened edgewise
to the cross pieces under them by screws or bolts. Twenty one friction
rollers, three inches in diameter and half an inch thick made of
iron or wood are placed between these two iron bars or pieces of
board on each side whose centres are four inches apart and whose
axes or arbors are inserted in the iron bars or boards. At each end
of the machine & seven eighths of an inch from the end, are circu-
-lar guides consisting of a half circle at each end nine inches and
a quarter in diameter, made of plank or iron, two inches thick and
fastened to the side planks. Nine and a half inches from one
end and on each of the side planks and three quarters of an inch
from the top and bottom is a half circle guide, seven inches and
seven eighths in diameter and half an inch thick. Eight inches &
three quarters from the other end and one inch and seven eighths
from the top and bottom, is another circular guide, consisting of
the arc of a circle whose diameter = nine inches and three quarters
and the chord of the arc is five inches and three eighths, and the
thickness of the guide is two inches. At one end of each tread
and on the under side thereof and near to the edges of the tread
are two pieces of wood or iron fastened with screws or bolts, three
inches and five eighths long on the side joining the tread and
one inch and seven eighths deep at the end of the tread. the other end of the piece comes to an edge and the under side is an arc of a circle whose diameter is nine inches and a quarter. On each end of the treads are thin iron plates, to prevent the wear of the treads. Instead of the inside guides, the piece of wood or iron on the under side of the tread and the bar of iron which is let into the under side of the side planks, may be used for the purpose of regula-
-ting the rising & falling of the treads two irons on each shaft nine inches long, two and a half inches wide and half an inch thick, let on to the ends of the shafts half an inch from the side planks and secured by bolts or screws so as to move or swing thereon. Three inches and three quarters from the centre of the shaft, in both ends of these irons, are holes five eighths of an inch in diameter; to receive the ends of the bolts in the ends of the treads as they rise and fall. Three inches from the shafts towards the ends of the machine are two circular pieces of iron three quarters of an inch thick in the centre and regularly diminishing in thickness so as to come to an edge at the ex-
tremities and made fast to the side planks. By means of these circular irons, the ends of the bolts on the treads are made to
=enter the irons on the shafts by which they are held while the treads pass round the notched wheels in ascending and de-
-scending). A Third method of constructing this machine varying from those above described is as follows. The machine being nine feet long, twenty five inches wide and fourteen inches deep, five pieces of plank, four inches wide and two inches thick, placed at equal distan-
=ces from each other, four inches and a half from the top of the side planks and inserted in them. Nine inches from each end of the machine and in the middle of the side planks, is a shaft which runs in boxes set in the plank. The forward shaft is one inch and a quarter square: and the hinder shaft two inches square, and extends eight inches from the bearings for the purpose of applying drums or gearing. On each of these shafts are two wheels, which run near to the side of the planks on the inside, being ten inches in diameter, and made with notches two and three quarter inches distant from one another, and three quarters
of an inch deep. There are seventy four treads for the horse to step or tread
upon, each of which is supported and carried on arbors or shafts twenty
two inches long and rounded two inches from the ends, and on each
end is a friction roller two inches and a half in diameter and half an
inch thick, running one inch and a half from the end. On the
top of the shafts or arbors, is fastened with screws or bolts, a strip of board
eighteen inches long, two inches and three quarters wide and one inch
thick. On the top of every second one of these strips, are pieces of wood
or iron three quarters of an inch square and five inches and a half
long. These are fastened across each end of them to prevent the treads
from canting. On the top of every other one of these strips, is a piece
of plank sixteen inches and a half long, five inches and a half
wide and two inches thick, setting the board and shaft or arbor
equally on each side. The ends of the shafts or arbors, mesh into
the notches in the ten inch wheels above mentioned. The ends of
arbors on the treads are kept in the notches or places made for
them in the wheels, by means of a circular guide made to prop
on the friction rollers of the treads, whilst moving round the
notched wheels. The friction rollers on which the treads run, are
kept in a direct course by strips of plank above and below the rollers
These strips are secured to the machine on the inside near the top
and bottom with spikes, bolts or pins. The boxes and circular guide
at the hinder end of the machine are connected together so as to
be moved back and forth by means of keys in order to bring the
treads suitably near each other. These treads may be made of cast
iron cast whole with the exception of the friction rollers and
the top plank or sheathing, and the pieces that cross on the ends
of the treads may be cast on every tread, instead of every other tread.
In constructing this machine according to either of the foregoing
methods the dimensions may be increased or diminished in any
degree that may be desirable. This machine may be put in motion
by means of horses or other animals. In operating with this machine A horse or other animal is introduced within the outside frame & made fast before and behind to the cross timbers at the top of the uprights. The horse or other animal is made to step or travel upon the treads, by which means the treads are caused to move towards the hinder part of the machine. When the machine is of the first above described mode of construction, as the treads pass from the iron bars on which the rollers move, they descend successively to the two strips of boards which go the whole length of the machine and upon them by means of the chain, rope or belt, are carried to the forward end of the machine with the same side upwards and the same end towards the forward end of the machine. At the forward end of the machine the treads are successively raised by the aid of the chain spur wheels, rollers, and two pieces of iron and made to pass again upon the iron bars. As the treads move, the shaft is also put in motion. When the machine is of the second described mode the treads move, fall and rise in a similar manner by means of the various mechanical contrivances in that mode specified and the shafts are put in motion by the bolts of the treads, which in their progress mesh into the notched wheels. When it is of the third described mode the treads being placed closely together form a kind of belt or band, and the treads as they arrive at the hinder & forward ends, instead of falling and rising as in the former modes, turn or roll round as they pass over the notched wheels. In order to apply the power of this machine to the practical purpose of moving other machinery, the latter must be connected with the long shaft of the machine, by the use of such gearing as the nature of the case may require. By varying the dimensions of the machine it may be made applicable to the carrying on of a great variety of operation. It may be used for propelling boats, to carry machinery for sawing wood, or for threshing grain, and for going through with numerous other mechanical processes. —

What I claim as new in this machine, and the improvement for which I ask an exclusive privilege, is the arranging and putting together as firstly and secondly described, for the purpose
of applying horse or other animal power in the way herein before
set forth. the various portions of the running parts of the machine
and the method of arrangement therein specified, of those parts
whereby the running parts are kept and maintained in their proper
place and position, and also the principle of causing the treads to fall
and rise at the ends of the machine without turning or rolling as
stated therein - also in the method thirdly above described so much
of the construction of the treads as consists in connecting the shafts
or arbors with the treads, also the principle of connecting and con-
-fining these treads together without the aid of chains, belts or bands,
by means of the guides and also the principle of casting the treads
entire as therein stated - In witness whereof I have hereunto
set my hand and seal at said Chatham the 27th day of April
A.D. 1831.

Witnesses
Horace Foote
John Markham

William E. Arnold.

(Patented 7th day of May 1831)